United States Patent [19]

Marti

[11] Patent Number: 5,060,782
[45] Date of Patent: Oct. 29, 1991

[54] AUTOMATIC MACHINE FOR POSITIONING AND FEEDING FLAT CONTAINERS

[76] Inventor: Jaime S. Marti, Emancipación No. 8, Barcelona, Spain, 08017

[21] Appl. No.: 589,007

[22] Filed: Sep. 27, 1990

[30] Foreign Application Priority Data

Sep. 27, 1989 [FR] France ................... 89 13046

[51] Int. Cl.⁵ ............................................. B65G 47/24
[52] U.S. Cl. ..................... 198/392; 198/397; 198/395; 198/400
[58] Field of Search ............... 198/395, 392, 393, 396, 198/397, 400, 416; 221/159, 160

[56] References Cited

U.S. PATENT DOCUMENTS

| | | |
|---|---|---|
| 990,593 | 4/1911 | Ringland et al. . |
| 1,823,995 | 9/1931 | Streby . |
| 1,989,924 | 2/1935 | Hill . |
| 2,033,090 | 3/1936 | Barker . |
| 2,278,599 | 4/1942 | Veit . |
| 2,343,496 | 3/1944 | Carroll . |
| 2,776,047 | 1/1957 | Howard . |
| 2,901,088 | 8/1959 | Evasic . |
| 2,904,162 | 9/1959 | Simer . |
| 2,972,410 | 2/1961 | Schulte et al. . |
| 3,012,651 | 12/1961 | Hawkes . |
| 3,079,042 | 2/1963 | Sterling . |
| 3,164,291 | 1/1965 | Sterling . |
| 3,295,659 | 1/1967 | Aidlin . |
| 3,338,373 | 8/1967 | Aidlin et al. . |
| 3,446,335 | 5/1969 | Dubuit ................... 198/392 X |
| 3,543,909 | 5/1968 | Ueda . |
| 3,650,368 | 3/1972 | Nalbach . |
| 3,656,604 | 4/1972 | Sterling . |
| 3,662,872 | 5/1972 | Nalbach . |
| 3,870,194 | 3/1975 | Taylor . |
| 3,948,386 | 4/1976 | Nalbach ................... 198/400 X |
| 4,130,194 | 12/1978 | Schindel et al. . |
| 4,154,329 | 5/1979 | Hildenbrand . |
| 4,388,989 | 6/1983 | Edmunds et al. . |
| 4,463,846 | 8/1984 | Ionesu . |
| 4,681,209 | 7/1987 | Marti . |
| 4,798,277 | 1/1989 | Dubuit et al. . |
| 4,854,442 | 8/1989 | Kroos ................... 198/400 |
| 4,865,181 | 9/1989 | Nalbach . |
| 4,928,808 | 5/1990 | Marti . |
| 4,949,834 | 8/1990 | Schindel ................... 198/392 |
| 4,979,607 | 12/1990 | Fogg ................... 198/400 X |

FOREIGN PATENT DOCUMENTS

| | | |
|---|---|---|
| 8538875 | 1/1979 | Australia . |
| 45910031 | 6/1966 | Fed. Rep. of Germany . |
| 2042547 | 8/1970 | Fed. Rep. of Germany . |
| 2427281 | 2/1975 | Fed. Rep. of Germany ...... 198/392 |
| 1558379 | 12/1979 | United Kingdom . |
| 2098589 | 11/1982 | United Kingdom ................ 198/393 |

*Primary Examiner*—D. Glenn Dayoan
*Attorney, Agent, or Firm*—Fleit, Jacobson, Cohn, Price, Holman & Stern

[57] ABSTRACT

An automatic machine for positioning and feeding containers or bottles having an irregular or oval shape and flat sides and a neck portion to continuously feed a work station, including a hopper, a bottom wall member in the hopper extending in a plane at an angle to the horizontal, a rotatable disc above and parallel to the bottom wall member, detachable container holding elements removably mounted at the periphery of the disc assembly and defining peripheral recesses for receiving individual containers or bottles from the hopper and moving the containers to a higher level for discharging them through a discharge opening in the bottom wall member, a chute for receiving the discharged containers or bottles and guiding and positioning them so that they are deposited on a belt conveyor assembly on their edge or narrower side, devices on the conveyor assembly for tilting the containers or bottles, a detector device on the conveyor assembly for detecting the position of the containers or bottles and emitting a signal to operate a separate pusher device if the containers or bottles are not in the proper position so that the containers or bottles are ultimately positioned lying on their larger or flat sides for transport by the conveyor to a work station.

20 Claims, 3 Drawing Sheets

AUTOMATIC MACHINE FOR POSITIONING AND FEEDING FLAT CONTAINERS

BACKGROUND OF THE INVENTION

1. Field of the invention

This invention relates to a machine intended for automatically positioning and continuously feeding flat containers lying uniformly on one of their largest sides to a work station such a printing unit.

2. Description of the Prior Art

Machines for automatically positioning and feeding containers, such as bottles, are known from U.S. Pat. Nos. 3,295,659 (AIDLIN) and 4,681,209 (MARTI), for example. The first patent describes a machine in which a rotatable disc inclined with respect to the horizontal forms the bottom of a receptacle into which the containers or bottles which are to be sorted are loaded at random, and has at its periphery a plurality of openings adapted to receive and retain the containers or bottles for transporting them from a receiving zone to an unloading zone where they drop through a chute to be oriented or positioned, falling by gravity through a guideway, or chute, to be transported away by an associated device. The second patent referred to above describes a container positioning machine having a plurality of chutes mounted on a revolving drum below the bottom of the hopper integral with a rotatable disc assembly, the recesses for receiving the containers on the disc assembly being formed by detachable parts which are interchangeable with replacement parts to accommodate different shapes and sizes of containers being handled wherein the chutes are also removable and exchangeable with chutes of different sizes.

These machines are not entirely suitable for continuously feeding to a work station containers such as bottles, which are not round but are irregular and substantially oval shaped in cross section having substantially flat or wider sides and positioned lying on one of their wider or flat sides.

BRIEF SUMMARY OF THE INVENTION

It is an object of this invention to provide a container positioning machine which overcomes the above problem.

It is a further object of this invention to provide a machine for sorting, positioning, and feeding irregular or substantially oval shaped containers to a conveyor for transporting them to a work station.

It is a further object to provide a conveyor for receiving irregular or oval shaped containers from a sorting machine lying on their narrower edge or sides and tilting them selectively onto one of their wider or flat sides.

The instant invention achieves this objective by providing a machine having a hopper for receiving a plurality of randomly positioned irregular or oval shaped containers having a neck including a bottom wall member secured in a fixed position at an angle to the horizontal, a rotatable disc assembly over the plane of the wall member in parallel relation and in proximity thereto, the disc assembly including removably mounted at its periphery a plurality of exchangeable container holding elements defining a series of spaced recesses between the elements having a length in a tangential direction, i.e. with respect to the disc assembly, greater than the height or length of the container or bottle, exclusive of the neck, and a width less than the thickness or width of the wider dimension thereof, each recess having on the upper marginal edge a seat for supporting the neck portion of the container or bottle, an opening formed in the bottom wall at the top or upper portion thereof arranged to have each recess in the peripheral section register therewith in succession as the disc assembly is rotated, the opening in the bottom wall having a width allowing tilting of each container into a predetermined position as the container passes over the opening, and a single removable inclined chute below the bottom wall opening for receiving and guiding containers discharged through the bottom wall opening in a predetermined position.

The recesses defined between the radial container holding elements have a dimension and shape for receiving individual containers lying only on the edge and the cross section of the inclined chute also has a shape and dimension for receiving and guiding containers discharged through the opening lying on the edge on the inclined bottom of the chute.

A container positioning and transporting device is associated with the inclined chute for receiving containers lying on the edge, conveying them lying on their edge along a first section thereof, detecting significant marks premarked on the surface of each container, or at least a part of its profile. In a second section thereof means are provided for tilting the containers selectively onto one or another of their wider or flat sides depending on the indication of the detected features or marks and conveying them lying uniformly on one of their wider or flat sides.

Other features of the invention and the advantages thereof will become apparent from the detailed description below.

BRIEF DESCRIPTION OF THE DRAWINGS

The invention will now be described in detail with reference to the accompanying drawings wherein.

DETAILED DESCRIPTION

Figure 1:
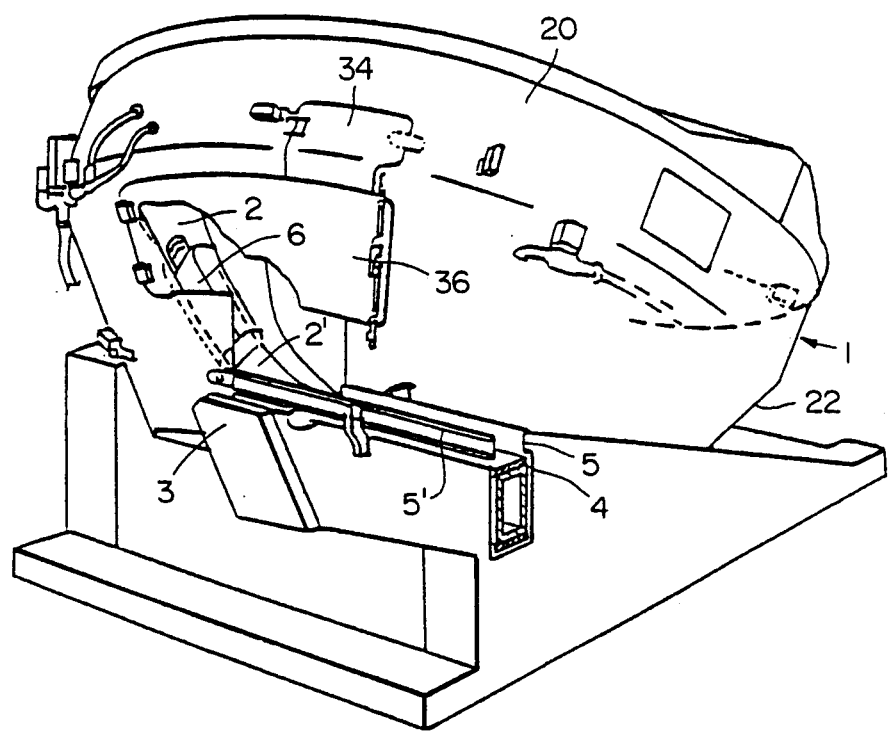
FIG. 1 is a schematic perspective view of the machine of the invention.
Figure 8:
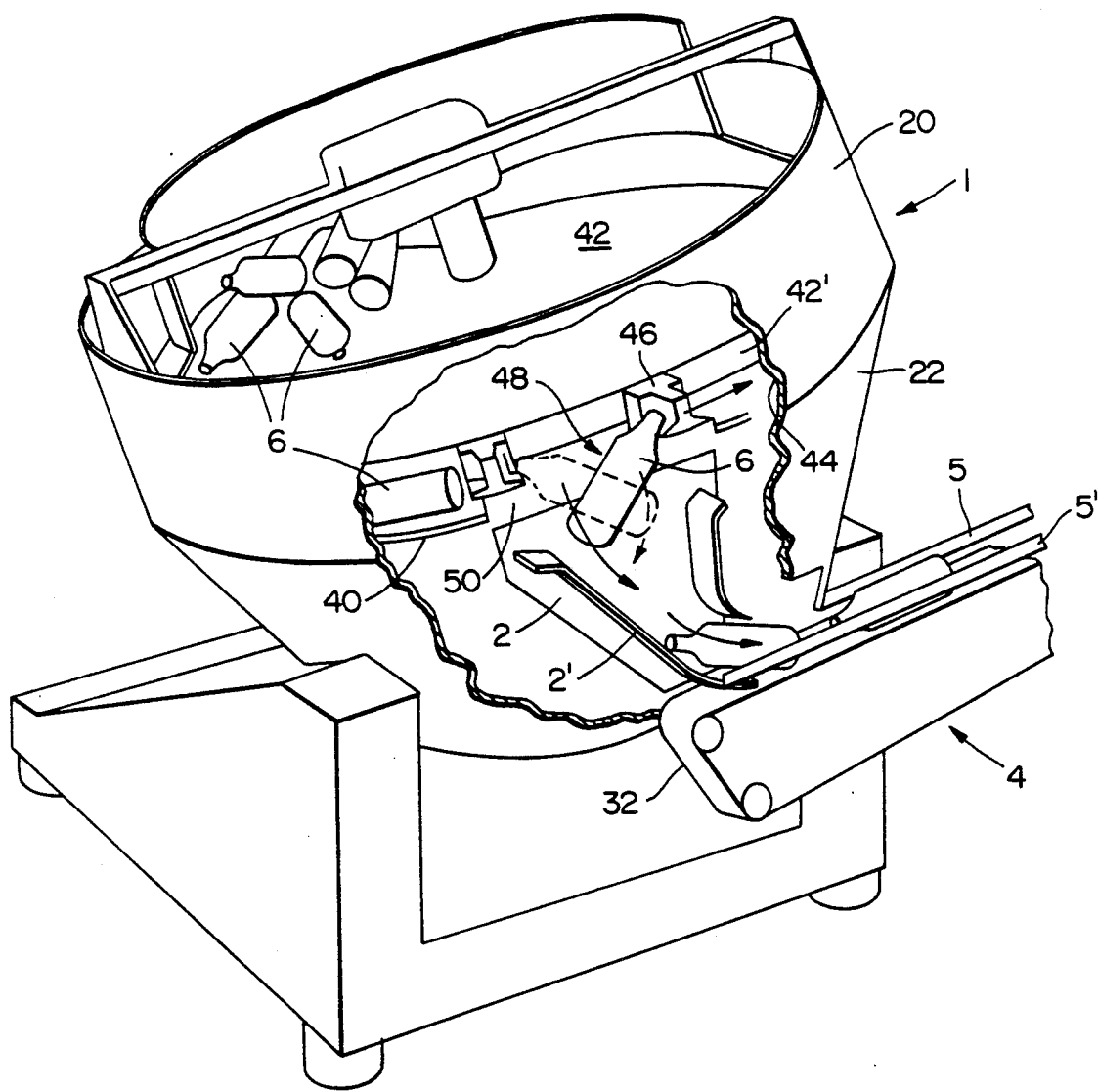
FIG. 8 is a perspective schematic view of the machine of the invention with the side of the hopper cut away to show hidden internal parts and the manner of operation thereof.

With reference to FIGS. 1 and 8, the machine of this invention includes a container positioning machine having a hopper generally shown at 1 for receiving a plurality of randomly positioned containers 6, a bottom wall member 40 in the hopper secured in a fixed position at an angle to the horizontal, and a rotatable disc assembly 42 rotatably mounted over the plane of the bottom wall member in parallel relation and in proximity thereto.

The full details of these parts and the plurality of detachable container holding members described hereafter are not shown in the drawings of this application and therefore to provide a full description of a workable embodiment of the invention my U.S. Pat. No. 4,681,209 is incorporated herein by reference for the purpose of showing the details of these parts. The hopper 1 has a cylindrical loading section 20, a lower conical section 22, a bottom wall member 40 in the lower part of cylindrical section 20 which may be a shelf (such as shown at 14 in my U.S. Pat. No. 4,681,209), or may be a continuous wall (such as shown at 12 in U.S. Pat. No. 3,295,659). Above the bottom wall member and in parallel spaced proximity thereto is rotatably mounted a disc assembly 42, which may be a pair of parallel discs (shown at 11 and 25 of my U.S. Pat. No. 4,681,209). The disc assembly is rotatably mounted for rotation on the axis of symmetry thereof inclined to the vertical (such as shown at 13 in my U.S. Pat. No. 4,681,209). The disc assembly 42 is radially spaced at its periphery from the inside wall 44 of the cylindrical section 20 to provide an annular space for container holders 46 which are removably attachable to the outer peripheral portion 42' of the disc assembly (such as elements 16, 19 as described and shown in FIGS. 4, 4a, 5, 6, and 7, for example, of my previous U.S. Pat. No. 4,681,209). The container holders 46 define between their sides, the periphery of the disc assembly and the inside wall 44 of the cylindrical wall section 20 a series of spaces 48 adapted to receive containers 6 in a position lying on a narrower edge or side thereof on bottom wall member 40, which containers have been fed randomly into the hopper and flow by gravity to the lower portion of the disc assembly into the spaces 48 defined by the container holders 46. The disc assembly and container holders attached at the periphery thereof rotate on an inclined plane to convey the containers from the lower position of the hopper to the upper position of the hopper along the bottom wall member 40 (such as in the manner shown and described in my U.S. Pat. No. 4,681,209). At the upper portion of the hopper, the bottom wall member is provided with an opening 50 through which the containers drop when moved into position over the opening by the container holders (such as described in my U.S. Pat. No. 4,681,209). In the instant invention, however, the containers drop through the opening 50 into a single inclined guiding chute 2 having a cross-sectional shape and dimensions to guide and position containers 6 so that they lie only on their edge, or narrower side, sliding on the bottom 2' of the chute which has a curved profile to gradually guide the containers to the lower end of the chute and onto a band or belt conveyor 4 lying on a narrower side in a manner clearly shown in FIG. 8. Also as shown in FIG. 8, the containers can be received in holder spaces 48 with the necks at either end and in either position will be discharged and tipped at opening 50.

Conveyor 4 includes in a first section cooperating means for maintaining the containers lying on their edge, or narrower side, in a slightly tilted position while displacing them and for detecting significant markings, or indicating means, or features such as profile, on the container lateral surface. In a second section, means are provided for tilting the containers onto one or another of their wider or flat sides depending on the indicating markings or features and signals provided by the detecting means.

A detecting device 11 such a photoelectric or photochromic sensor is mounted on the conveyor 4 in a position to detect a coded indicator premarked or fixed on the containers and upon detecting such an indicator the detector emits a signal which is fed to a pusher device described below.

Figure 2:
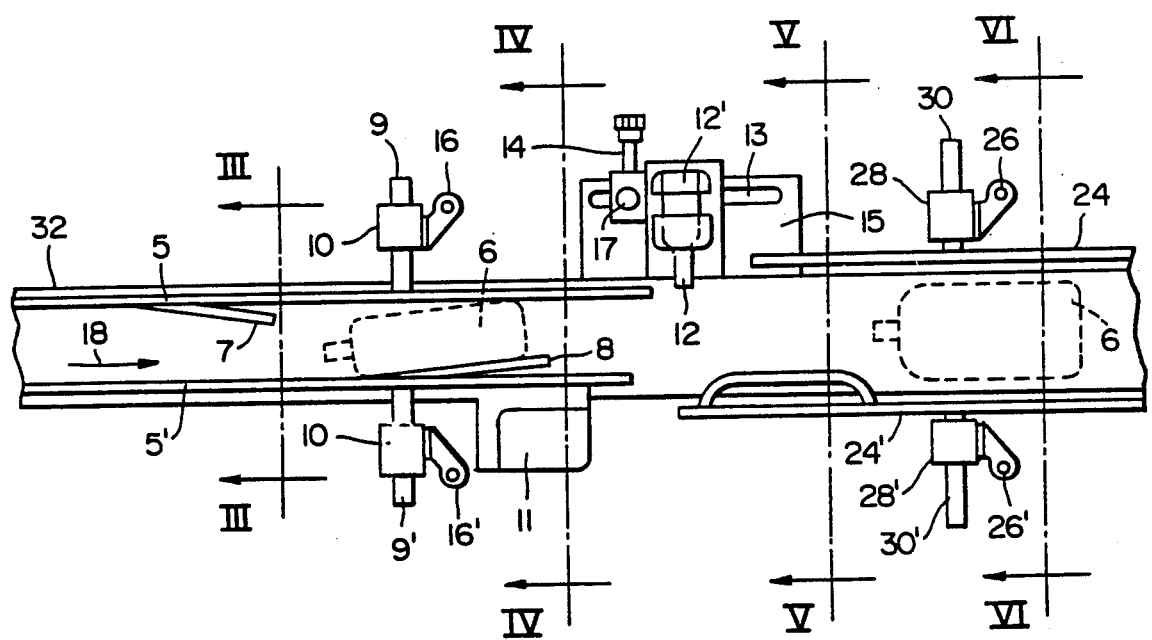
FIG. 2 is a top plan view of the container positioning and transporting device in accordance with the invention.
Figure 3:
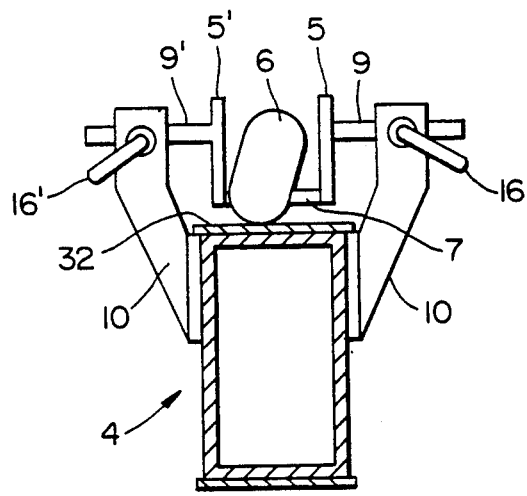
FIGS. 3 and 4 are schematic cross-sectional views taken along lines III—III and IV—IV, respectively, in FIG. 2 showing the action of tilting bars on the containers.
Figure 4:
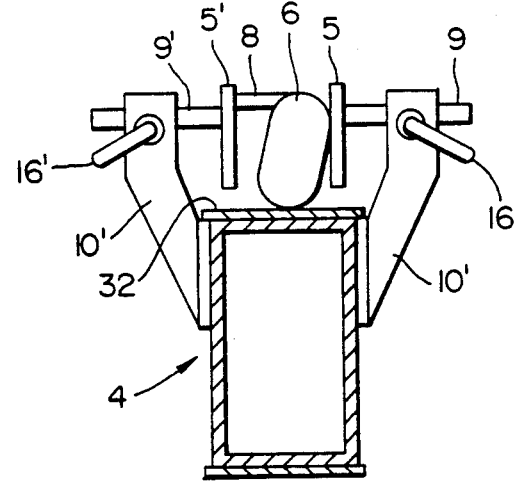
Figure 5:
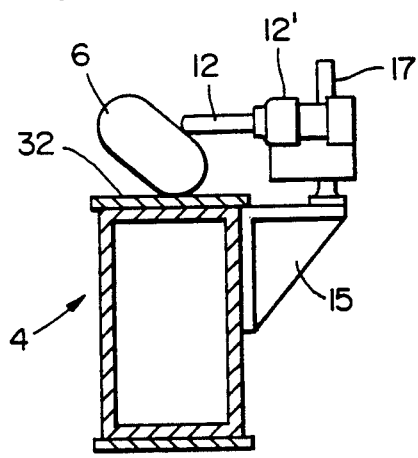
FIG. 5 is a cross-sectional view taken along line V—V of FIG. 2 showing the action of the pusher means on the containers.

Two opposite sidewalls 5, 5' are supported at a first section of the conveyor, onto which the containers are deposited from chute 2, by adjustable rods or shafts 9, 9' for adjusting the spacing between the sidewalls 5, 5'. Shafts or rods 9, 9' are slidably mounted in brackets 10 at opposite sides of the conveyor 4, as more clearly shown in FIGS. 3 and 4. A clamping device 16, 16' removably clamps rods 9, 9' in selected positions in the respective brackets 10 to allow adjusting the spacing between walls 5, 5'. Wall 5 has extending therefrom a lower tilting bar 7 which extends into the space between the sidewalls, as shown in FIG. 3, to engage with and tilt the container in the predetermined direction as shown as the containers 6 move along the conveyor 4 in the direction shown by arrow 18 in FIG. 2, or away from the chute 2 as shown in FIG. 1. Further along the conveyor in the direction of the arrow 18, upper tilting bar 8 projects from sidewall 5' into the space between the sidewalls as shown in FIG. 4 to engage the upper portion of container 6 lying on its edge to tilt the upper portion of the container, or maintain it tilted, toward sidewall 5 as shown in FIG. 4. Thus, the combined effect of the sidewalls and tilting bars 7 and 8 is to tilt the containers lying on their edge and being conveyed along conveyor 4 in a predetermined tilted direction. The tilting bars 7 and 8 function to tilt and maintain the containers in the proper predetermined tilted position so that the indicator markings or features thereon will be in proper position to be detected by the detector 11 in the relative position as shown in FIG. 2.

Located downstream of the tilting bar 8 is the pusher or tilting device comprised of pushing element 12, which may be a rod shaped member, mounted in pusher operator 12' which is electrically connected to detector 11 to be operated thereby for adjusting pusher rod 12 toward and away from the central region of the conveyor to selectively position it for engagement with the containers being conveyed along the conveyor. Pusher operator 12' may be a solenoid type device wherein pusher 12 is the armature, or is connected to the armature, thereof Pusher operator 12' is adjustably mounted on vertical rod or shaft 17 in a conventional sliding or screw thread type adjustment arrangement for adjustment vertically with respect to the conveyor 4. Rod or shaft 17 is adjustably mounted on a support bracket 15, attached at the side of conveyor 4, such as in slot 13 for horizontal adjustment longitudinally relative to the conveyor. An additional horizontal adjustment may be provided by a horizontal rod or shaft 14 cooperating with a suitable conventional mounting means in combination with the adjusting means described above for adjusting pusher unit 12' toward and away from the center region of the conveyor. In such case, adjusting device 14 would be adjustably mounted on rod or shaft 17 and pusher device 12' would be mounted on adjusting device 14. Pusher device 12, 12' could also be a pneumatic or hydraulic piston and cylinder device with suitable fluid circuits and operated by valves controlled electrically by detector 11. The details of these adjusting means including the clamping means for setting them in any predetermined position would be well known to one having ordinary skill in the art and therefore are not shown herein.

Downstream of the pusher unit is mounted a further guiding and positioning unit consisting of side walls 24, 24' mounted on rod or shaft members 30, 30' adjustably mounted in brackets 28, 28', these elements being similar to those shown in FIGS. 3 and 4. Clamping devices 26, 26' similar to 16, 16' of FIGS. 3 and 4 are provided in support brackets 28, 28' for allowing adjustment of rods or shafts 30, 30' therein for adjusting the spacing between side wall elements 24, 24'.

Figure 6:
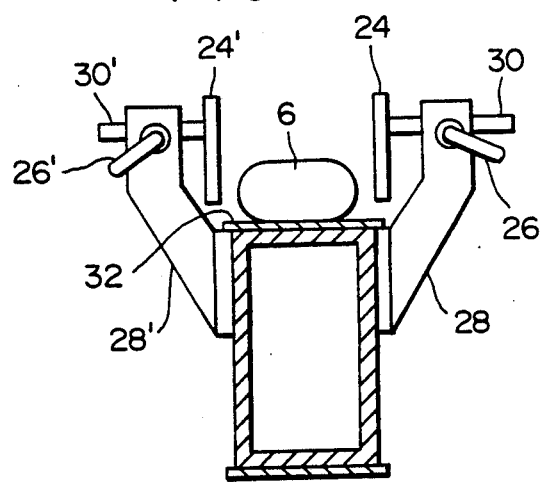
FIG. 6 is a cross-sectional view taken along line VI—VI of FIG. 2.
Figure 7:
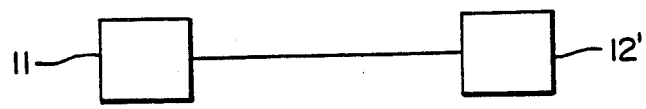
FIG. 7 is a schematic diagram showing the electrical connection between the detector and pusher means.

In the operation of the apparatus of this invention, as described above, containers or bottles 6 are discharged from the lower end of chute 2 so that they are resting or lying on the narrow side, or edge, on the conveyor belt 32 of conveyor 4. The containers are retained in this position by the side walls 5, 5' of the conveyor assembly and as they travel along on the conveyor belt 32 they are engaged at their lower part by tilting bar 7 and subsequently at their upper part by tilting bar 8 so that they are tilted in a proper preselected position to expose the indicator markings, or features on the containers or profile thereof in the proper position for detection by the photoelectric or photochromic detector means 11. Detector means 11 then reads the indicator markings or features. The indicator markings are devised and adapted to be read by the detector to indicate whether the container or bottle is in the proper tilted position so that it will tilt by gravity onto its larger or flat side, or whether it is not in the proper tilting position If in the proper tilted position, detector 11 will not emit a signal to operate pushing device 12, 12', and the container or bottle merely falls by gravity onto its flat or larger side. If the container or bottle is not in the correct tilted position, the detector will detect this by the indicator markings and emit a signal which operates pusher unit 12, 12' to push the container or bottle in the desired correction to cause it to tilt and fall so that it lies on its flat or larger side to be further guided and retained in this position downstream of the pusher unit as shown in FIG. 6. The same operation is achieved by adapting the detector to read features, such as profile, on the container to sense whether they are in the correct position, or whether to actuate pushing device 12, 12' as described above.

Door 34 is provided in hopper 1 to provide access to the container holding elements for the purpose of exchanging them with holding elements of different sizes to facilitate handling different sized containers, such as shown at 35 (FIG. 12) of my U.S. Pat. No. 4,681,209. Door 36 is also provided in the hopper to provide access to the removable chute 2 for exchanging this element with chutes of different sizes for the same purpose.

I claim:
1. A machine for continuously positioning and feeding containers having an irregular or substantially oval shape with wider sides, narrower sides, and a neck portion to a work station comprising:
   a hopper for receiving a plurality of randomly positioned containers;
   a bottom wall member on said hopper positioned in a plane extending at an angle to the horizontal so that the wall member has a higher portion and a lower portion;
   a rotatable disc means over the plane of said bottom wall member in substantially parallel relation and in proximity thereto;
   a plurality of detachable container holding elements removably mounted at the periphery of said disc means and defining spaced peripheral recesses between said elements, said recesses having a dimension and shape for receiving individual containers and moving said containers from said lower portion of said bottom wall member to said higher portion upon rotation of said disc means, said container holding elements having marginal edges and seat means at said marginal edges for engaging the neck portion of a container;
   an opening in said bottom wall member at said higher portion thereof positioned so that said recesses register therewith upon rotation of said disc means, said opening in said bottom wall member having a width allowing tipping of each container into a predetermined position as the container passes through said opening;
   an inclined chute means below said bottom wall member opening having an inclined bottom and a cross-sectional dimension and shape for receiving and guiding containers discharged through said opening sliding downwardly on said inclined bottom of said chute means and discharging said containers in a position to lie on one of the narrower sides thereof;
   conveyor means adjacent said chute means for receiving containers from said chute means and transporting the containers to a position remote from said chute means;
   detector means for detecting the position of said containers on said conveyor means and emitting a signal when said containers are not in a predetermined position; and
   first tilting means operatively connected to said detector means for tilting said containers into a predetermined position in response to said signal from said detector means, so that said containers lie on one of the wider sides thereof on said conveyor means downstream of said tilting means.

2. A machine as claimed in claim 1 where said conveyor means comprises:
   a belt conveyor assembly; and further comprising
   second and third tilting means mounted on said conveyor assembly displaced from said first tilting means for engaging containers transported on said conveyor assembly and tilting said containers in a predetermined direction.

3. A machine as claimed in claim 2 wherein said second and third tilting means comprises:
   spaced side wall members adjustably mounted on said conveyor assembly adjacent said chute means for adjusting the relative spacing of said side wall members for guiding and maintaining said containers lying on a narrow side thereof;
   a lower tilting element on one of said side wall members for engaging the container at a lower portion thereof and tilting the container in one direction; and
   an upper tilting element on the other of said side wall members for engaging the containers at an upper portion thereof and further tilting the containers in said one direction.

4. A machine as claimed in claim 3 wherein:
   said lower tilting element comprises a lower tilting bar projecting from a lower portion of said one side wall member into the space between said side wall members; and said upper tilting element comprises an upper tilting bar projecting from an upper portion of said other side wall member into the space between said side wall members downstream of said lower tilting bar.

5. A machine as claimed in claim 1 wherein said inclined bottom of said chute means comprises:
   an upper portion adjacent said opening in said bottom wall member;
   a lower end portion adjacent said conveyor means; and
   a curved portion between said upper and lower portions.

6. A machine as claimed in claim 3 wherein said bottom of said chute means comprises:
   an upper portion adjacent said opening in said bottom wall member;
   a lower end portion adjacent said conveyor assembly; and
   a curved portion between said upper and lower portions.

7. A machine as claimed in claim 1 wherein said detector means comprises:
   a photoelectric detector means mounted on said conveyor means and directed toward the path of travel of the containers on said conveyor means and adapted to detect the position of the containers; and
   means for emitting an electrical signal when a container is not in a predetermined correct position.

8. A machine as claimed in claim 6 wherein said detector means comprises:
   a photoelectric detector means mounted on said conveyor assembly and directed toward the path of travel of the containers on said conveyor assembly and adapted to detect the position of the containers; and
   means for emitting an electrical signal when a container is not in a predetermined correct position.

9. A machine as claimed in claim 1 wherein said first tilting means comprises:
   an actuator means adjustably mounted on said conveyor means and having a displaceable member with a pusher element thereon projecting substantially toward the central portion of said conveyor means so that upon actuation of said actuator means by a signal from said detector means said pusher element is displaced by said displaceable member toward the central portion of said conveyor means for engaging a container thereon and tilting the container to cause it to fall onto one of its wider sides.

10. A machine as claimed in claim 8 wherein said first tilting means comprises:
    an actuator means adjustably mounted on said conveyor assembly and having a displaceable member with a pusher element thereon projecting substantially toward the central portion of said conveyor assembly so that upon actuation of said actuator means by a signal from said detector means said pusher element is displaced by said displaceable member toward the central portion of said conveyor assembly for engaging a container thereon and tilting the container to cause it to fall onto one of its wider sides.

11. A machine as claimed in claim 1 and further comprising:
    guide means adjustably mounted on said conveyor means downstream of said first tilting means for guiding said containers in the position of lying on one of the wider sides thereof.

12. A machine as claimed in claim 10 and further comprising:
    guide means adjustably mounted on said conveyor means downstream of said first tilting means for guiding said containers in the position of lying on one of the wider sides.

13. A machine as claimed in claim 11 wherein said guide means comprises:
    a pair of spaced substantially planar guide members; and
    means for mounting said guide members on said conveyor means for adjustment relative to said conveyor means to adjust the space between said guide members.

14. A machine as claimed in claim 12 wherein said guide means comprises:
    a pair of spaced substantially planar guide members; and
    means for mounting said guide members on said conveyor assembly for adjustment relative to said conveyor assembly to adjust the space between said guide members.

15. A machine as claimed in claim 9 wherein:
    said actuator means comprises a solenoid means.

16. A machine as claimed in claim 10 wherein:
    said actuator means comprises a solenoid means.

17. A machine as claimed in claim 9 wherein:
    said actuator means comprises a pneumatic means.

18. A machine as claimed in claim 10 wherein:
    said actuator means comprises a pneumatic means.

19. A machine as claimed in claim 1 wherein said detector means comprises:
    a photochromic detector means mounted on said conveyor means and directed toward the path of travel of the containers on said conveyor means and adapted to detect the position of the containers; and
    means for emitting an electrical signal when a container is not in a predetermined correct position.

20. A machine as claimed in claim 6 wherein said detector means comprises:
    a photochromic detector means mounted on said conveyor assembly and directed toward the path of travel of the containers on said conveyor assembly and adapted to detect the position of the containers; and
    means for emitting an electrical signal when a container is not in a predetermined correct position.

* * * * *